(12) United States Patent
Hashimoto et al.

(10) Patent No.: US 12,152,121 B2
(45) Date of Patent: Nov. 26, 2024

(54) VEHICLE SEAT CORE MATERIAL (71) Applicant: JSP Corporation, Tokyo (JP)

(72) Inventors: Keiichi Hashimoto, Kanuma (JP); Katsunori Hisamatsu, Kanuma (JP); Shogo Iwasaki, Kanuma (JP)

(73) Assignee: JSP Corporation, Tokyo (JP)

( * ) Notice: Subject to any disclaimer, the term of this patent is extended or adjusted under 35 U.S.C. 154(b) by 131 days.

(21) Appl. No.: 17/995,082

(22) PCT Filed: Mar. 26, 2021

(86) PCT No.: PCT/JP2021/012833
§ 371 (c)(1),
(2) Date: Sep. 29, 2022

(87) PCT Pub. No.: WO2021/200641
PCT Pub. Date: Oct. 7, 2021

(65) Prior Publication Data
US 2023/0167260 A1 Jun. 1, 2023

(30) Foreign Application Priority Data
Mar. 31, 2020 (JP) .................................. 2020-062350

(51) Int. Cl.
*C08J 9/228* (2006.01)
*B60N 2/70* (2006.01)
(Continued)

(52) U.S. Cl.
CPC ................ *C08J 9/228* (2013.01); *B60N 2/70* (2013.01); *C08J 9/0061* (2013.01); *C08J 9/224* (2013.01);
(Continued)

(58) Field of Classification Search
CPC . C08J 9/228; C08J 9/0061; C08J 9/224; C08J 2203/22; C08J 2323/12;
(Continued)

(56) References Cited

U.S. PATENT DOCUMENTS

2011/0018329 A1* 1/2011 Galbreath .......... B60N 2/01508
296/63
2012/0115968 A1* 5/2012 Shima ........................ C08J 9/18
427/222
(Continued)

FOREIGN PATENT DOCUMENTS

JP 5664143 B2 2/2015
JP 2015-137061 A 7/2015
(Continued)

OTHER PUBLICATIONS

International Search Report issued in PCT/JP2021/012833; mailed Jun. 1, 2021.
(Continued)

*Primary Examiner* — Nathan L Van Sell
(74) *Attorney, Agent, or Firm* — Studebaker & Brackett PC (57) ABSTRACT

A vehicle seat core material includes a molded article that includes thermoplastic resin expanded beads. The molded article has a substantially rectangular shape in a top view, and has a front side and a rear side opposite the front side. The molded article has an average density (Z) of 20 kg/m³ to 50 kg/m³. The molded article includes, on the rear side of the molded article, a rear thin portion having a thickness of 10 mm to 40 mm, the thickness of the rear thin portion being smaller than an average thickness of the molded article. A ratio (Y/Z) of a density (Y) of the rear thin portion to the
(Continued)

average density (Z) of the molded article is 1.05 to 3. The rear thin portion of the molded article has a fusion rate of 70% or more.

7 Claims, 5 Drawing Sheets

(51) Int. Cl.
  *C08J 9/00* (2006.01)
  *C08J 9/224* (2006.01)
(52) U.S. Cl.
  CPC ........ *C08J 2203/22* (2013.01); *C08J 2323/12* (2013.01); *C08J 2423/06* (2013.01)
(58) Field of Classification Search
  CPC ........ C08J 2423/06; B60N 2/70; B60N 2/015; B60N 2/682; B60N 2/72; B60N 2/7017
  See application file for complete search history.

(56) References Cited

U.S. PATENT DOCUMENTS

| | | |
|---|---|---|
| 2019/0014907 A1 | 1/2019 | Hisamatsu et al. |
| 2019/0176669 A1 | 6/2019 | Noro et al. |
| 2019/0217759 A1 | 7/2019 | Sakakibara |

FOREIGN PATENT DOCUMENTS

| | | |
|---|---|---|
| JP | 2018-029844 A | 3/2018 |
| JP | 2018-034547 A | 3/2018 |
| JP | 2019-030597 A | 2/2019 |
| WO | 02/069765 A1 | 9/2002 |
| WO | 2017/135456 A1 | 8/2017 |

OTHER PUBLICATIONS

The extended European search report issued by the European Patent Office on Mar. 15, 2024, which corresponds to European Patent Application No. 21780352.7-1012 and is related to U.S. Appl. No. 17/995,082.

* cited by examiner

VEHICLE SEAT CORE MATERIAL

TECHNICAL FIELD

The present invention relates to a vehicle seat core material.

BACKGROUND ART

In recent years, as a seat core material for a vehicle such as an automobile (hereinafter, also referred to as "seat core material"), a core material including a thermoplastic resin expanded beads molded article (hereinafter, also referred to as "expanded beads molded article") has been used. In addition, there is a vehicle seat in which a cushion material such as polyurethane foam is stacked on an upper surface side of the seat core material, and a seat cover made of cloth, leather, or the like is disposed on an upper surface side of the cushion material (for example, Patent Literatures 1 and 2).

The seat core material including the expanded beads molded article as described above may include a thick front portion and a thin rear portion.

CITATION LIST

Patent Literature

Patent Literature 1: JP 2018-29844 A
Patent Literature 2: WO 2017/135456 A1

SUMMARY OF INVENTION

Technical Problem

As for an expanded beads molded article having a thin part, the mechanical strength of the thin part is likely to be insufficient. The expanded beads molded article may be cracked or chipped during conveyance or the like. In particular, in a case where a front part of a seat core material including an expanded beads molded article is formed to be thick and a rear part of the seat core material is formed to be thin, a hook member to a vehicle may be provided at the thin rear part of the molded article. Since a load generated by the hook member is applied to the thin part, the thin rear part of the molded article may be cracked or chipped.

The present invention was made in view of the circumstances of the background art described above, and an object thereof is to provide a vehicle seat core material including an expanded beads molded article, in which cracking or chipping is less likely to occur in a thin portion.

Solution to Problem

In the present invention, the vehicle seat core material described in the following [1] to [6] is provided to achieve the object.

[1] A vehicle seat core material comprising a thermoplastic resin expanded beads molded article,
wherein the thermoplastic resin expanded beads molded article has a substantially rectangular shape in a top view,
the thermoplastic resin expanded beads molded article has an average molded article density (Z) of 20 kg/m³ to 50 kg/m³,
the thermoplastic resin expanded beads molded article includes, on a rear side of the thermoplastic resin expanded beads molded article, a rear thin portion having a thickness of 10 mm to 40 mm, the thickness of the rear thin portion being smaller than an average thickness of the thermoplastic resin expanded beads molded article,
a ratio (Y/Z) of a molded article density (Y) of the rear thin portion to the average molded article density (Z) of the thermoplastic resin expanded beads molded article is 1.05 to 3, and
the rear thin portion of the thermoplastic resin expanded beads molded article has a fusion rate of 70% or more.

[2] The vehicle seat core material according to [1], wherein the thermoplastic resin expanded beads molded article includes, on a front side of the thermoplastic resin expanded beads molded article, a front thick portion having a thickness of 80 mm or more.

[3] The vehicle seat core material according to [2], wherein the front thick portion of the thermoplastic resin expanded beads molded article has a fusion rate of 40% or more.

[4] The vehicle seat core material according to any one of [1] to [3], wherein a frame member is embedded in the rear thin portion of the thermoplastic resin expanded beads molded article along a longitudinal direction of the thermoplastic resin expanded beads molded article.

[5] The vehicle seat core material according to any one of [1] to [4], wherein expanded beads constituting the thermoplastic resin expanded beads molded article are multilayer expanded beads having an expanded core layer and a coating layer that covers the expanded core layer.

[6] The vehicle seat core material according to [5], wherein a melting point of the coating layer constituting the multilayer expanded beads is lower than a melting point of the expanded core layer by 1° C. to 25° C.

Advantageous Effects of Invention

The vehicle seat core material in the present invention includes a thermoplastic resin expanded beads molded article having a substantially rectangular shape in a top view, and the thermoplastic resin expanded beads molded article includes a rear thin portion having a thickness of 10 mm to 40 mm, the thickness of the rear thin portion being smaller than an average thickness of the thermoplastic resin expanded beads molded article. The thermoplastic resin expanded beads molded article has an average molded article density (Z) of 20 kg/m³ to 50 kg/m³, a ratio (Y/Z) of a molded article density (Y) of the rear thin portion to an average molded article density (Z) of the thermoplastic resin expanded beads molded article is 1.05 to 3, and a fusion rate of the rear thin portion of the thermoplastic resin expanded beads molded article is as high as 70% or more. Such a vehicle seat core material is a vehicle seat core material in which cracking or chipping is less likely to occur even in a rear thin portion of the vehicle seat core material.

DESCRIPTION OF EMBODIMENTS

Hereinafter, an embodiment of a vehicle seat core material in the present invention is described in detail with reference to the drawings.

In the following description, a preferable numerical range in the present invention may be described as appropriate, and in this case, a preferable range regarding the upper limit and the lower limit of the numerical range, a more preferable range, and a particularly preferable range can be determined among all combinations of the upper limit and the lower limit. Unless otherwise specified, a front-rear direction, left-right direction, and up-down direction of the vehicle seat core material are the same as a front-rear direction, left-right direction, and up-down direction of the vehicle when the vehicle seat core material is disposed in the vehicle.

Figure 1:
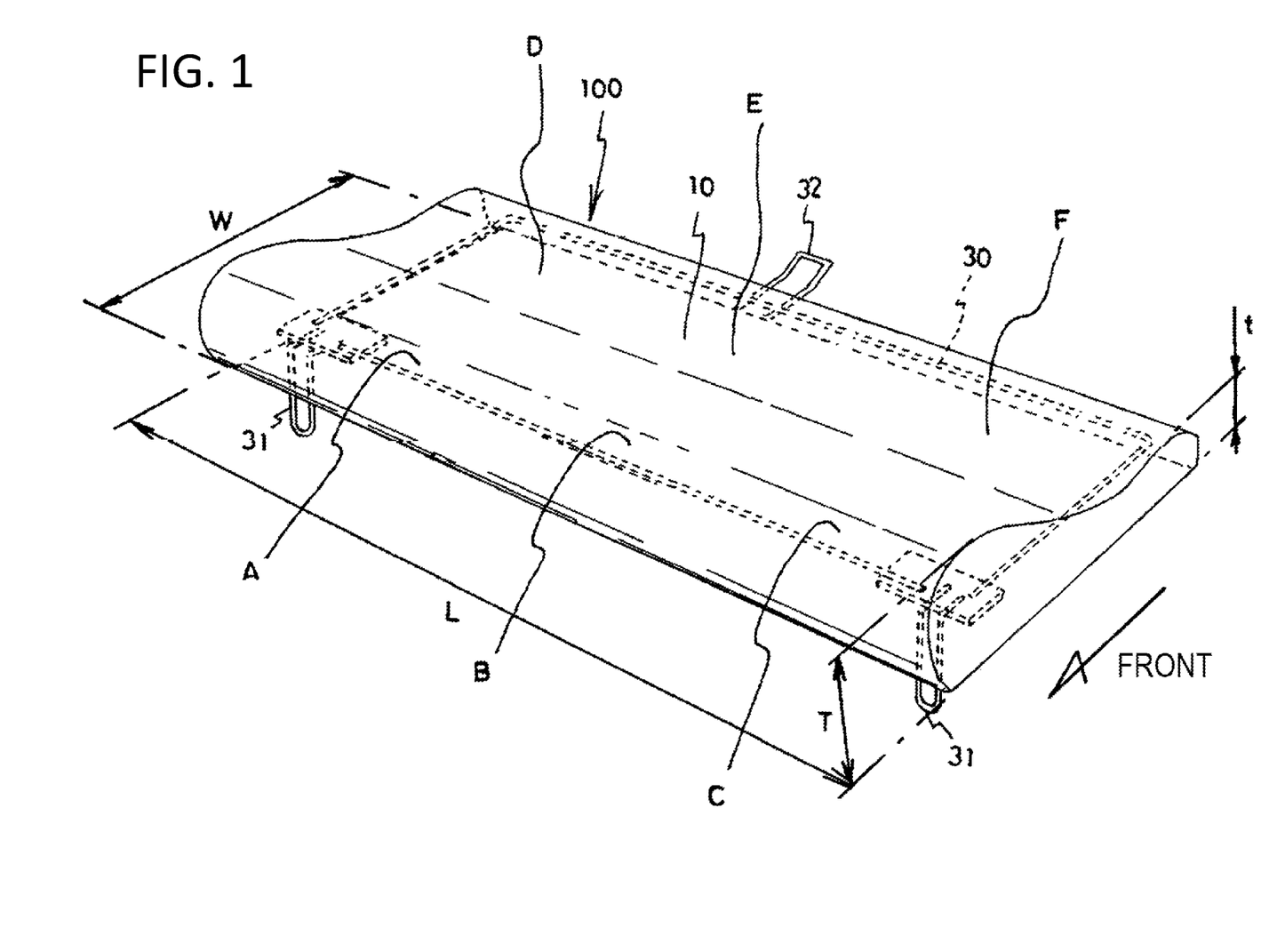
FIG. 1 is a conceptual perspective view showing an embodiment of a vehicle seat core material in the present invention.

As shown in FIG. 1, in a vehicle seat core material 100 in the present invention, an outer shape of the seat core material is formed by a thermoplastic resin expanded beads molded article 10 having a substantially rectangular shape in a top view and having a thick front side and a thin rear side. In general, a cushion material such as urethane foam is stacked on an upper surface of the seat core material 100, and a surface of the cushion material is covered with a seat cover made of cloth or leather. In this manner, a vehicle seat including the seat core material, the cushion material, and the seat cover is formed, and the vehicle seat is disposed at a position serving as a seat of the vehicle.

On the rear side of the expanded beads molded article 10, a rear thin portion (thin region) having a thickness (t) of 10 mm to 40 mm, the thickness of the rear thin portion being smaller than an average thickness of the expanded beads molded article 10, is formed. It is preferable that the rear thin portion has a part formed to have a thickness (t) of 35 mm or less, and the part having a thickness of 35 mm or less occupies at least 70% of the volume of the rear thin portion.

On the other hand, it is preferable that, on a front side of the expanded beads molded article 10, a front thick portion (thick region) having a thickness (T) of 80 mm or more is formed. It is more preferable that the front thick portion has a part formed to have a thickness (T) of 85 mm or more, and the part having a thickness of 85 mm or more occupies at least 70% of the volume of the front thick portion. It is particularly preferable that the front thick portion has a part formed to have a thickness (T) of 90 mm or more, and the part occupies at least 80% of the volume of the front thick portion. On the other hand, the upper limit of the thickness (T) of the front thick portion is approximately 150 mm.

In the expanded beads molded article 10, the front thick portion having a thickness (T) of 80 mm or more preferably occupies at least 50% of the entire volume of the expanded beads molded article 10, and more preferably occupies at least 60% of the entire volume of the expanded beads molded article 10. It should be noted that the upper limit of the volume proportion is approximately 90%. Within the above range, it is easy to produce a vehicle seat core material including the expanded beads molded article 10 excellent in a lightweight property and a seating feeling.

On the other hand, in the expanded beads molded article 10, the rear thin portion having a thickness (t) of 10 mm to 40 mm preferably occupies at least 5% of the entire volume of the expanded beads molded article 10, and more preferably occupies at least 8% of the entire volume of the expanded beads molded article 10. It should be noted that the upper limit of the volume proportion is approximately 20%. Within the above range, it is easy to produce a vehicle seat core material including the expanded beads molded article 10 excellent in strength.

Figure 4A:
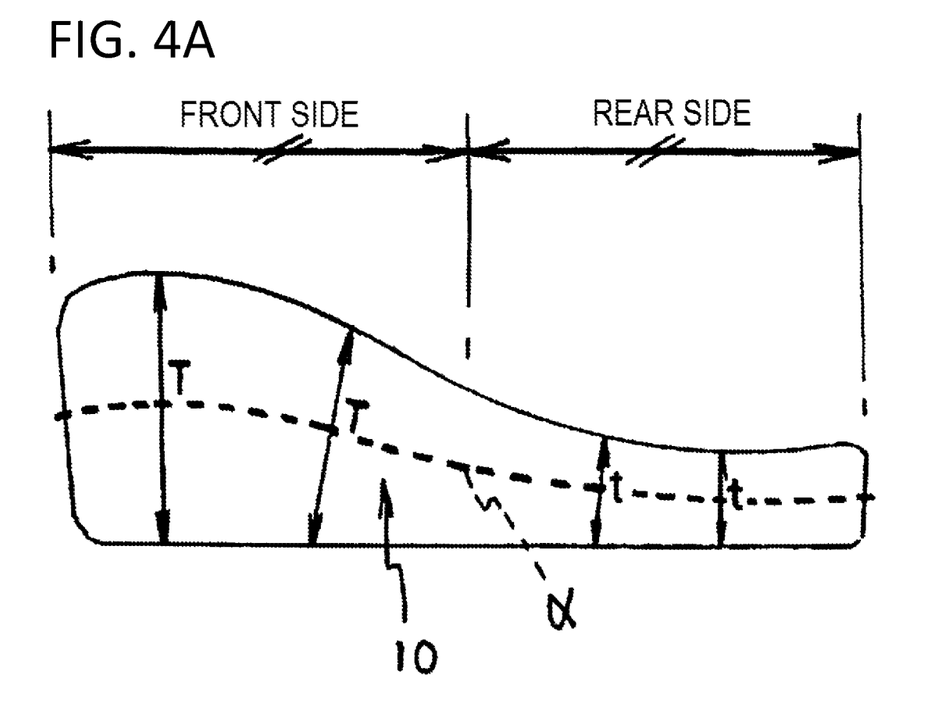
FIG. 4A is an illustration view conceptually showing a front side and rear side of an expanded beads molded article and thicknesses of each part.
Figure 4B:
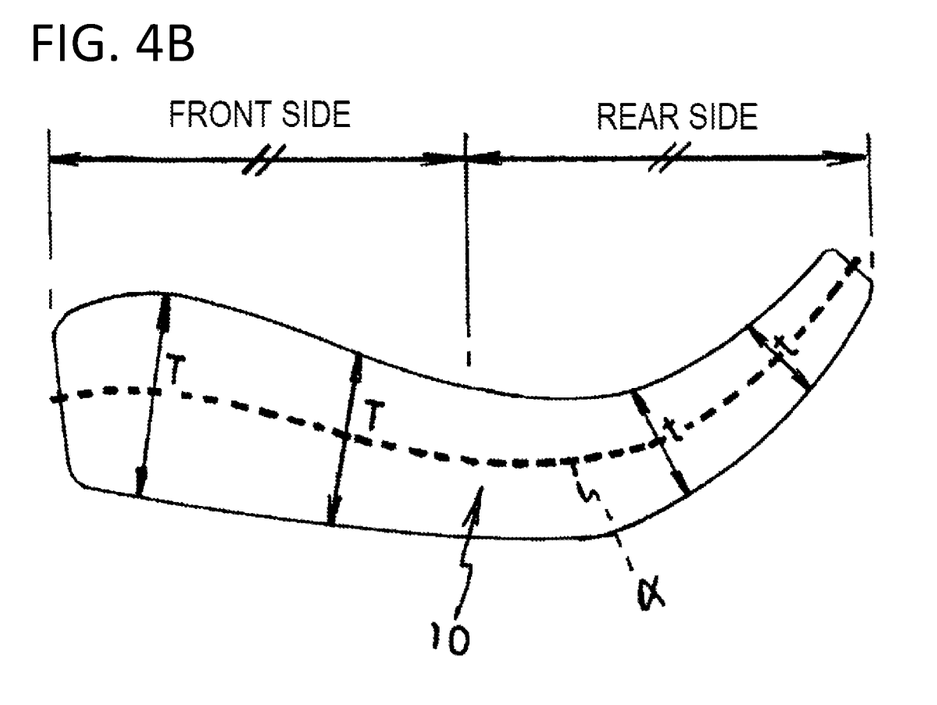
FIG. 4B is an illustration view conceptually showing a front side and rear side of an expanded beads molded article and thicknesses of each part.

As conceptually shown in FIG. 4A and FIG. 4B, the front side of the expanded beads molded article 10 in this description refers to a part from the center to the front in the front-rear direction of the expanded beads molded article 10 in a top view when the expanded beads molded article 10 is mounted on a vehicle. On the other hand, the rear side of the expanded beads molded article 10 refers to a part from the center to the rear in the front-rear direction of the expanded beads molded article 10.

As conceptually shown in FIG. 4A and FIG. 4B, the thickness (T) of the expanded beads molded article 10 or the thickness (t) of the expanded beads molded article 10 refers to the vertical length of the part of the expanded beads molded article at respective positions relative to a center line a of the thickness of the expanded beads molded article 10.

The expanded beads molded article 10 preferably has a substantially rectangular shape in a top view, and more preferably has a rectangular shape in a top view. It is more preferable that the length (L) of the expanded beads molded article 10 is about 1000 mm to 1500 mm, the width (W) of the expanded beads molded article 10 is about 400 mm to 600 mm, and the shape of the expanded beads molded article 10 is a substantially rectangular shape.

In this description, the term "substantially rectangular shape" means that, for example, corners of a rectangle may be rounded. A part or all of the sides of the rectangle may be bent side(s). The length and width dimensions of the substantially rectangular shape of the expanded beads molded article 10 are appropriately designed depending on a vehicle at which the expanded beads molded article 10 is to be disposed. Therefore, the dimensions of the expanded beads molded article 10 is not limited to the dimensions described above. Further, a through hole for weight reduction or a through hole for a positional relationship with other members may be formed at an appropriate position of the expanded beads molded article 10.

The expanded beads molded article 10 has an average molded article density (Z) of 20 kg/m$^3$ to 50 kg/m$^3$. In the case where the average molded article density of the expanded beads molded article 10 is within the above range, a vehicle seat core material having excellent strength and lightweight properties can be obtained. From this viewpoint, the lower limit of the average molded article density (Z) of the expanded beads molded article 10 is preferably 25 kg/m$^3$, more preferably 27 kg/m$^3$, and particularly preferably 30 kg/m$^3$. The upper limit of the average molded article density (Z) of the expanded beads molded article 10 is preferably 45 kg/m$^3$, more preferably 43 kg/m$^3$, and particularly preferably 40 kg/m$^3$.

The molded article density (Y) may be simply referred to as "density (Y)", and the average molded article density (Z) may be simply referred to as "average density (Z)".

A ratio (Y/Z) of the molded article density (Y) of the rear thin portion to the average molded article density (Z) of the expanded beads molded article 10 is 1.05 to 3. In the case where the molded article density (Y) of the rear thin portion is higher than the average molded article density (Z) and the above range is satisfied, the strength of the thin portion can be improved. From this viewpoint, the lower limit of the ratio (Y/Z) of the molded article density (Y) of the rear thin portion to the average molded article density (Z) of the expanded beads molded article is preferably 1.08, and more preferably 1.10. The upper limit of the ratio (Y/Z) is preferably 2, and more preferably 1.5.

A ratio (Y/X) of the molded article density (Y) of the rear thin portion to the molded article density (X) of the front thick portion of the expanded beads molded article 10 is preferably 1.1 to 3. In the case where the molded article density (Y) of the rear thin portion is higher than the molded article density (X) of the front thick portion and the above range is satisfied, the strength of the thin portion can be improved. In particular, in the present invention, the molded article that satisfies the above ratio (Y/X) of the molded article density (Y) of the rear thin portion to the molded article density (X) of the front thick portion is formed as an integrally molded article, so that the entire seat core material has excellent strength. From this viewpoint, the lower limit of the ratio (Y/X) of the molded article density (Y) of the rear thin portion to the molded article density (X) of the front thick portion is more preferably 1.1, and particularly preferably 1.15. The upper limit of the ratio (Y/X) is more preferably 2, and particularly preferably 1.5.

The average molded article density (Z) of the expanded beads molded article 10 may be measured as follows.

In the expanded beads molded article 10 after the molding shrinkage is settled, cut samples each having a predetermined dimension are cut out from at least 15 positions in total such that the sample positions are substantially equally separated in the front-rear direction and the left-right direction. The volume V ($cm^3$) of the cut samples is determined, and the weight M (g) of the cut samples is measured. M/V is calculated by dividing the weight M (g) of the cut sample by the volume V ($cm^3$) of the cut sample. The values of M/V calculated for the cut samples are arithmetically averaged, and the average molded article density (Z) of the expanded beads molded article 10 can be calculated.

The molded article density (X) of the front thick portion may be measured as follows.

A cut sample having a predetermined dimension is cut out from a part that is located on the front side of the expanded beads molded article 10 after the molding shrinkage is settled and has a thickness T satisfying T≥80 mm. Regarding the cut sample, a value of Mx/Vx calculated by dividing the weight Mx (g) of the cut sample by the volume Vx ($cm^3$) of the cut sample can be defined as the molded article density (X) of the front thick portion.

Further, the molded article density (Y) of the rear thin portion may be measured as follows.

A cut sample having a predetermined dimension is cut out from a part that is located on the rear side of the expanded beads molded article 10 after the molding shrinkage is settled and has a thickness t satisfying t≤40 mm. Regarding the cut sample, a value of My/Vy calculated by dividing the weight My (g) of the cut sample by the volume Vy ($cm^3$) of the cut sample can be defined as the molded article density (Y).

In a case where unevenness or the like is formed in the measured part described above, it is preferable to sample the cut sample so as to avoid the uneven portion. In a case where the frame member is embedded in the expanded beads molded article, the measurement is performed excluding the part of the frame member.

Figure 3A:
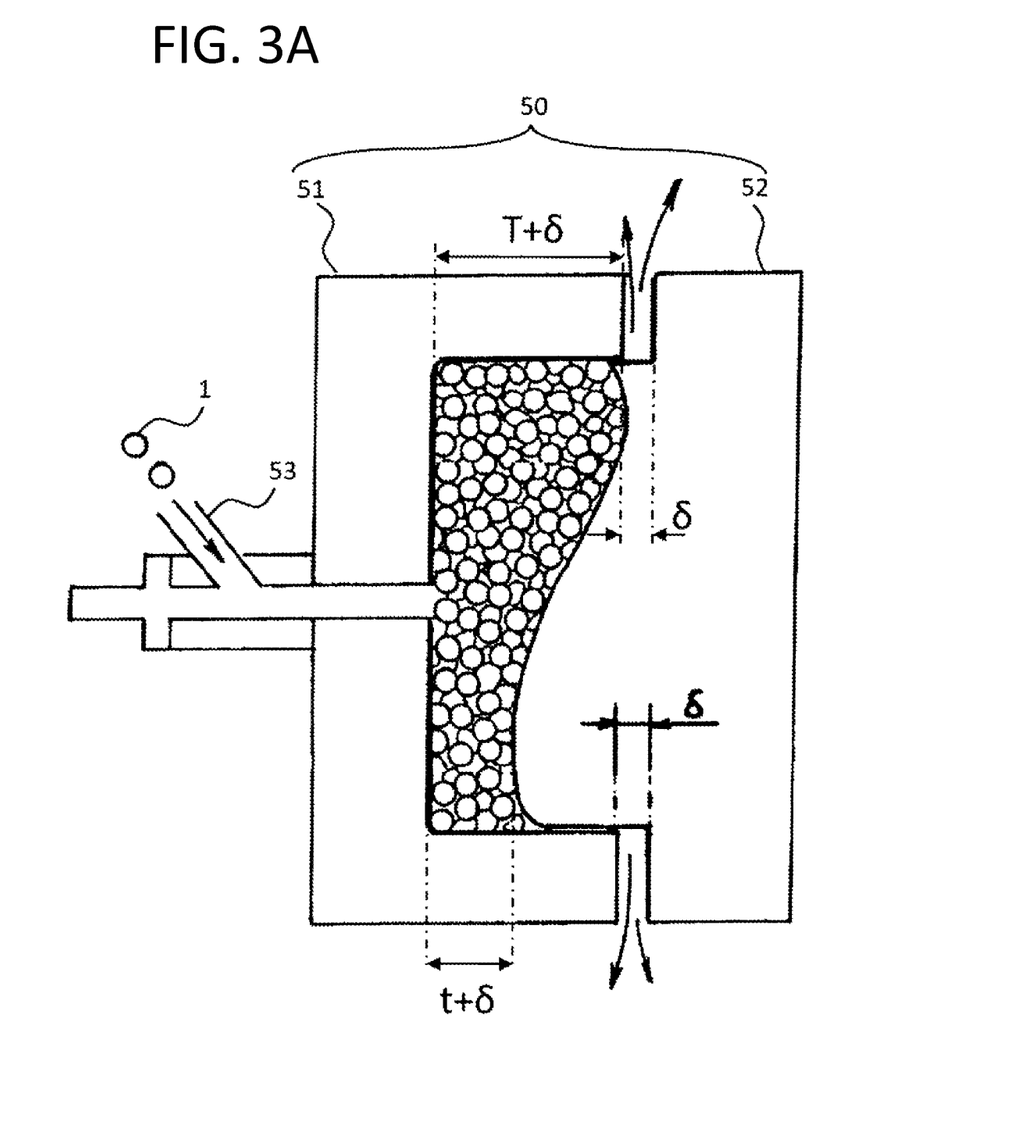
FIG. 3A is an illustration view conceptually showing a method for filling a mold with expanded beads by cracking filling.

The expanded beads molded article 10 in which the ratio (Y/Z) of the molded article density (Y) of the rear thin portion to the average molded article density (Z) of the expanded beads molded article is 1.05 to 3, that is, the expanded beads molded article 10 in which the molded article density (Y) of the rear thin portion is higher than the average molded article density (Z), can be obtained, for example, by performing molding using a cracking filling method. As shown in FIG. 3A, the cracking filling method is a method in which a mold is filled with the expanded beads in a state where the mold is not completely closed and is provided with a slight gap (cracking gap 6), and molding is performed. In the above method, molded articles having different densities can be obtained by using one kind of expanded beads.

In this manner, cracking filling is performed to mold the expanded beads molded article serving as the seat core material into a specific shape, and the thin portion is compressed more than the other parts in the mold, so that the molded article density (Y) of the thin portion can be higher than the average molded article density (Z), and the thin portion can be made locally high in density to obtain a strong molded article.

In addition, the fusion rate of the rear thin portion of the expanded beads molded article 10 is 70% or more. The molded article density (Y) of the rear thin portion is set to be higher than the average molded article density (Z) as described above, and the fusion rate is set to be sufficiently high, so that it is possible to provide a vehicle seat core material in which cracking or chipping is less likely to occur even in the rear thin portion. From this viewpoint, the lower limit of the fusion rate of the rear thin portion is preferably 75%, more preferably 78%, and particularly preferably 80%. The upper limit of the fusion rate of the rear thin portion is preferably 95%, more preferably 93%, and particularly preferably 92%.

In the above expanded beads molded article 10, increasing the molded article density (Y) of the rear thin portion and increasing the fusion rate of the rear thin portion are important for preventing cracking and chipping of the thin portion and maintaining the strength of the entire vehicle seat core material.

Here, in general, when an attempt is made to increase the molded article density, gaps between the expanded beads in the mold become small, and the flow of a molding steam is deteriorated, so that a fusion property between the expanded beads tends to decrease. However, in the thin portion, the thickness of the molded article is small, so that the flow of the molding steam in the thickness direction is sufficiently ensured, and the fusion property is not deteriorated. Therefore, in a case where the compression rate of the thin portion is locally increased by molding using the cracking filling method described above, the molded article density (Y) of the thin portion can be increased without decreasing the fusion rate of the expanded beads of the entire molded article.

On the other hand, in the front thick portion of the expanded beads molded article 10, the thickness of the molded article is large, so that the molding steam is difficult to spread to the inside in the thickness direction. The fusion of the expanded beads in the thick portion tends to be reduced. Therefore, when an attempt is made to increase the amount of the molding steam in order to improve the fusion property of the front thick portion, the thin portion is overheated. Therefore, it may be difficult to obtain an expanded beads molded article having a good appearance. Therefore, in general, in an expanded beads molded article having both a thick portion and a thin portion, it is difficult to integrally mold the thick portion and the thin portion while maintaining an appearance of the expanded beads molded article.

Even in such a case, for example, as expanded beads of the expanded beads molded article 10, multilayer expanded beads including an expanded layer to be described in detail later as a core layer and a coating layer provided on a surface of the expanded layer (core layer) can be used. In the multilayer expanded beads, a resin having an excellent fusion property is used for the coating layer, so that the fusion property of the expanded beads themselves can be improved. By using such multilayer expanded beads, it is possible to obtain an expanded beads molded article in which a good appearance is maintained, the fusion rate in the front thick portion is improved and the strength of the rear thin portion is also improved.

In addition, the above-described multilayer expanded beads having a good fusion property may be used, but a measure may be adopted to facilitate a molding steam during molding to flow in the mold. That is, a larger number of steam holes are locally formed in a part of a mold for the thick portion to allow much amount of heated steams to flow into a molding space of the thick portion, so that the fusion rate of the thick portion is locally improved.

The lower limit of the fusion rate of the front thick portion is preferably 40%, more preferably 45%, and still more preferably 50%. The upper limit of the fusion rate of the front thick portion is more preferably 90%, and still more preferably 80%.

The fusion rate of the expanded beads molded article 10 can be determined based on the ratio (fusion rate) of the number of expanded beads having undergone material fracture to the number of expanded beads exposed from a fracture surface when the expanded beads molded article is fractured.

Specifically, a sample of the expanded beads molded article is cut in the thickness direction of the expanded beads molded article with a cutter knife, and then the expanded beads molded article is broken from the cut portion. Next, the number (n) of the expanded beads present on the fracture surface and the number (b) of the expanded beads having undergone material fracture are measured. A ratio (b/n) of (b) to (n) can be expressed in percentage as a fusion rate (%).

The fusion rate of the front thick portion is determined by cutting out a cut sample having a predetermined dimension from a part located on the front side of the expanded beads molded article 10 after the molding shrinkage is settled and satisfying that the thickness T is 80 mm or more, and determining the fusion rate of the cut sample by the method for measuring the fusion rate of the expanded beads molded article 10.

The fusion rate of the rear thin portion is determined by cutting out a cut sample having a predetermined dimension from a part located on the rear side of the expanded beads molded article 10 after the molding shrinkage is settled and satisfying that the thickness t is 40 mm or less, and determining the fusion rate of the cut sample by the method for measuring the fusion rate of the expanded beads molded article 10.

The expanded beads of the expanded beads molded article 10 described above may be single-layer expanded beads consisting of an expanded layer, or may be multilayer expanded beads including an expanded layer as a core layer and a coating layer provided on a surface of the expanded layer (core layer).

In the case of multilayer expanded beads, a resin constituting the expanded core layer and a resin constituting the coating layer are not particularly limited as long as they are thermoplastic resins. For example, resins having the same physical properties may be used, but resins having different melting points are preferable. In particular, the resin constituting the coating layer is preferably a resin having a melting point lower than that of the resin constituting the expanded core layer. Specifically, the melting point of the resin constituting the coating layer is preferably lower than the melting point of the resin constituting the core layer by 1° C. to 25° C., more preferably lower than the melting point of the resin constituting the core layer by 3° C. to 20° C., and particularly preferably lower than the melting point of the resin constituting the core layer by 5° C. to 15° C. When the difference in melting point between the resin constituting the coating layer and the resin constituting the core layer is within the above range, an expanded beads molded article having good fusion bonding can be obtained even when in-mold molding is performed at a low molding vapor pressure.

The melting point of the resin is a value determined as a peak temperature of an endothermic peak associated with melting of the resin on a DSC curve when "a case where a melting temperature is measured after a certain heat treatment is performed" described in JIS K7121 (1987) (both the heating rate and the cooling rate in the state adjustment of a test piece are 10° C./min) is adopted, the temperature is raised at a heating rate of 10° C./min using a differential scanning calorimeter (DSC), and the DSC curve is drawn. In a case where a plurality of endothermic peaks is present on the DSC curve, a peak of an endothermic peak having the largest area is defined as the melting point. As a measuring device, for example, DSCQ 1000 manufactured by TA Instruments may be used.

Examples of the base resin constituting the expanded beads include a polystyrene-based resin, a polyolefin-based resin such as polyethylene and polypropylene, a polyester-based resin such as polybutylene succinate, polyethylene terephthalate, and polylactic acid, and a polycarbonate-based resin. In addition, a composite resin of a polystyrene-based resin and a polyolefin-based resin, a mixture of two or more of the above resins, and the like may also be used. Among these, a thermoplastic resin containing a crystalline resin such as a polyolefin-based resin or a composite resin of a polyolefin-based resin and a polystyrene-based resin is preferable. The polyolefin-based resin is preferably a polyethylene-based resin or a polypropylene-based resin, and a polypropylene-based resin is more preferable from the viewpoint of strength and impact resistance.

In the case of the multilayer expanded beads, the same resin as that of the expanded beads described above can be used as the base resin of the core layer and the coating layer. Among them, it is preferable that the core layer is made of a polyolefin-based resin and the coating layer is made of a polyolefin-based resin, and it is more preferable that the core layer is made of a polypropylene-based resin and the coating layer is made of a polypropylene-based resin or a polyethylene-based resin. The weight ratio between the coating layer and the core layer in the multilayer expanded beads is preferably 1:99 to 20:80, and more preferably 4:96 to 15:85.

A frame member may be embedded in the expanded beads molded article 10. Therefore, the seat core material includes a thermoplastic resin expanded beads molded article, and examples thereof include not only an aspect in which only the expanded beads molded article 10 is included but also an aspect in which the expanded beads molded article 10 and a frame member are included. By embedding the frame member in the expanded beads molded article, the strength of the seat core material 100 is improved, and the attachment to the vehicle is facilitated. From this viewpoint, the frame member is preferably embedded at least in the rear thin portion of the expanded beads molded article 10. As shown in FIG. 1, it is particularly preferable that an annular frame member is embedded along a peripheral edge of the expanded beads molded article 10. In addition, it is preferable that the seat core material does not contain urethane foam.

In the embodiment shown in FIG. 1, an annular frame member 30 is embedded along an outer edge of the expanded beads molded article 10. A front hook member 31 and a rear hook member 32 are provided at appropriate positions of the annular frame member 30. As shown in FIG. 1, parts of the hook members 31 and 32 protrude outward from the expanded beads molded article 10. Here, examples of the annular frame member 30 include an aspect in which a wire constituting the frame member is annularly formed along the outer edge of the expanded beads molded article 10 without a seam. Examples of the annular frame member 30 also include an aspect in which the wire constituting the frame member is connected to another member (for example, a plate-shaped plate part) to form an annular shape as a whole. Examples of the seamless wire include not only a single continuous wire but also a continuous body of two or more wires joined to each other by welding or the like at a predetermined position.

The wire and plate each constituting the frame member 30 are generally made of, for example, a metal material such as iron, aluminum, or copper, a resin material, or a material such as ceramic. Among them, from the viewpoint of durability, strength, and heat resistance to heat during molding of the expanded beads molded article, a wire and plate each containing a metal material is preferable. Among them, it is more preferable that the wire and plate each constituting the frame member 30 are substantially made of a metal material. The metal material is particularly preferably steel. The frame member 30 in which these materials are connected using a method such as welding or the materials are bent can efficiently reinforce the expanded beads molded article 10. The frame member 30 supports the hook members 31 and 32 by being coupled to the hook members 31 and 32 for vehicle.

The expanded beads molded article 10 in which the frame member 30 is embedded can be produced by the following in-mold molding method.

First, the frame member 30 is disposed at a predetermined position in a mold for molding a vehicle seat core material. Then, the mold is filled with the expanded beads by the above-described cracking filling method, and the cracking gap of the mold is closed.

Thereafter, a heating steam is introduced into the mold to heat the expanded beads to cause secondary expansion, and at the same time, the expanded beads are fused to each other.

Accordingly, the seat core material 100 including a composite molded article in which the frame member 30 is embedded in the expanded beads molded article 10 is produced.

The seat core material 100 produced in this manner is an integrally molded product of the expanded beads molded article 10 and the frame member 30, and is excellent in integrity of both.

As described above, the vehicle seat core material 100 in the present invention includes the thermoplastic resin expanded beads molded article 10 having a substantially rectangular shape in a top view. The thermoplastic resin expanded beads molded article 10 includes the rear thin portion having a thickness (t) of 10 mm to 40 mm, the thickness (t) being smaller than the average thickness of the thermoplastic resin expanded beads molded article, and the expanded beads molded article has an average molded article density (Z) of 20 kg/m$^3$ to 50 kg/m$^3$. The ratio (Y/Z) of the molded article density (Y) of the rear thin portion to the average molded article density (Z) of the expanded beads molded article is as high as 1.05 to 3, and the fusion rate of the rear thin portion of the expanded beads molded article 10 is as high as 70% or more. The vehicle seat core material 100 is a vehicle seat core material in which cracking or chipping is less likely to occur even in the rear thin portion.

EXAMPLES

Figure 2:
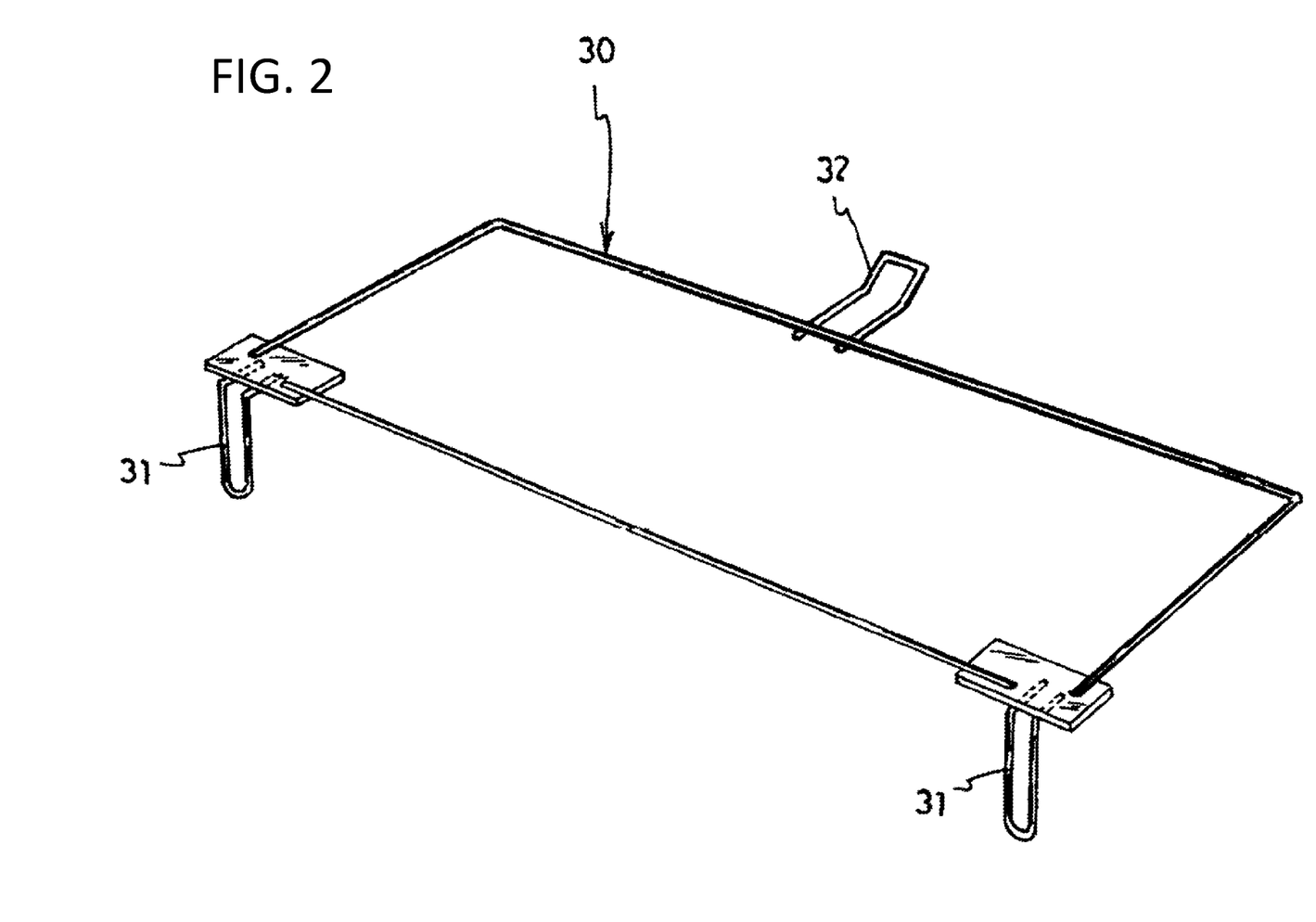
FIG. 2 is a conceptual perspective view showing a frame member used in the vehicle seat core material shown in FIG. 1.

Examples and Comparative Examples using the following multilayer expanded beads were carried out as follows.
Properties of the multilayer expanded beads used (core layer: polypropylene-based resin, coating layer: polyethylene-based resin)
Apparent density: 30 g/L
High-temperature peak heat value: 14.8 J/g
Heat of dissolution: 73.6 J/g
Melting point of core layer resin: 141.5° C.
Melting point of coating layer resin: 131° C.
Weight ratio of coating layer resin: 3%
A frame member having the same configuration as that of the frame member 30 shown in FIG. 2 was made of an iron wire having a diameter of 4.5 mm and a tensile strength (JIS G 3532 SWM-B) of 500 N/mm$^2$ and an iron plate having a thickness of 1 mm, a width of 80 mm, and a length of 170 mm. An iron wire having a diameter of 5 mm was used for iron U-shaped hooks constituting the front hook members 31 at two locations on the front side and the rear hook members 32 at one location on the rear side. The iron wire and iron plate each constituting the frame member 30 were joined by welding. Both end portions of the iron U-shaped hook constituting the front hook member 31 were joined to the iron plate by welding.

The frame member 30 described above was placed in a mold for producing the vehicle seat core material shown in FIG. 1. The dimensions of the mold are as follows: a total volume: 32 L, a length L: 1330 mm, a width W: 600 mm, a thickness T of a front portion A: 100 mm, a thickness T of a front portion B: 90 mm, a thickness T of a front portion C: 80 mm, a thickness t of a rear portion D: 35 mm, a thickness t of a rear portion E: 30 mm, and a thickness t of a rear portion F: 25 mm. After the molding, a seat core material corresponding to the mold is obtained.

Subsequently, the mold was opened and closed in a direction substantially corresponding to a thickness direction of the front portion of the seat core material, and the mold was clamped until a state where the mold was opened by 10 mm (cracking gap δ: 10 mm) was achieved. Then, the mold was filled with the above multilayer expanded beads, and thereafter, complete mold clamping was performed so as to crush the filling multilayer expanded beads (cracking filling method).

At this time, as shown in FIG. 3A, when an interval of the cracking gap is denoted by δ, the thickness of the part to be the front thick portion of the seat core material is T+δ, and the thickness of the part to be the rear thin portion is t+δ

Figure 3B:
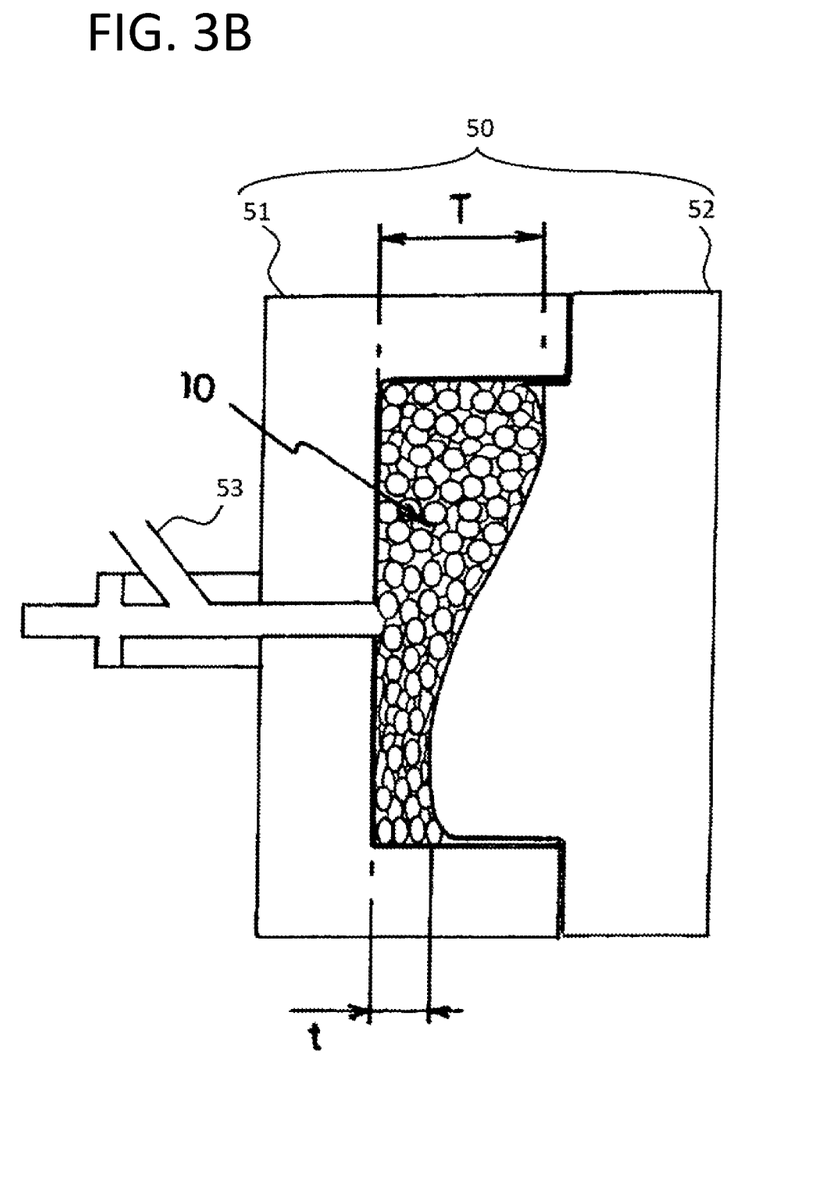
FIG. 3B is a view showing a state of the expanded beads when the mold is completely closed.

(where t<T). Next, as shown in FIG. 3B, when the cracking gap of the mold is closed, the part to be the front thick portion of the seat core material is compressed from the thickness T+δ to T, so that the molded article density of the part to be the front thick portion becomes (1+δ/T) times the density before compression, and the compression rate as shown in Table 1 is obtained. On the other hand, the thickness of the part to be the rear thin portion of the seat core material is reduced from t+δ to t, so that the molded article density of the part to be the rear thin portion is (1+δ/t) times the density before compression, and the compression rate as shown in Table 1 is obtained. By performing cracking molding in this manner, the molded article density of the rear thin portion of the seat core material can be higher than the molded article density of the front thick portion in a case where the apparent densities of the expanded beads themselves are the same and the filling density of expanded beads in the part to be the front thick portion and the filling density of expanded beads in the part to be the rear thin portion before closing the gap are the same.

Subsequently, steam was supplied into the mold for 4 seconds in a state in which drain valves of the mold on both sides were opened, and preheating (exhaust step) was performed. Thereafter, heating (primary heating) was performed from one side at a molding steam pressure of 0.14 MPa, and further heating (secondary heating) was performed from the opposite direction at a molding steam pressure of 0.20 MPa, and then steam was supplied from both surfaces of the mold at a molding steam pressure of 0.28 MPa, and main heating was performed for 3 seconds.

After the completion of the heating, the pressure of the mold was released, and then the mold was cooled to obtain the expanded beads molded article 10.

The obtained molded article was cured at 75° C. for 12 hours, and then the molded article was slowly cooled for 6 hours. The cured molded article was used as a seat core material.

The average molded article density (Z) of the expanded beads molded article constituting the seat core material was 30 kg/m³.

Regarding the seat core material in Examples obtained as described above, thick parts of the front portions A to C of the expanded beads molded article 10 and thin parts of rear portions D to F (see FIG. 1) were measured in terms of the compression rate, the molded article density, the fusion rate, and the tensile strength. The measurement results are shown in Table 1.

The compression rate, the molded article density, and the like were determined as follows.
(Determination of Compression Rate)

The length of a part corresponding to each of the parts (A to F) of the mold for molding a seat core material in the mold moving direction was defined as (a mm), the mold was filled with the expanded beads in a state in which the mold was opened by 10 mm from a state in which the mold was completely closed, and the compression rate in a case where the mold was completely closed after the filling was completed was calculated by the following formula (10 mm/a mm)×100.
(Sampling of Test Pieces)

In the expanded beads molded article 10 after the molding shrinkage was settled, cut samples each having a test piece length of 150 mm in the left-right direction of the expanded beads molded article 10, a test piece width of 25 mm in the thickness direction of the expanded beads molded article 10, and a test piece thickness of 20 mm in the front-rear direction of the expanded beads molded article 10 were respectively cut out from the six positions A to F shown in FIG. 1 to obtain test pieces. The test pieces were collected from a center part of the expanded beads molded article 10 in the thickness direction, and three test pieces were collected at each of the sample positions A to F.
(Measurement of Molded Article Density)

The bulk volume (150×25×20 (mm³)) was determined from external dimensions of each test piece. In addition, the weight (g) of each test piece was accurately weighed. The weight of each test piece determined as described above was divided by the bulk volume of the test piece, and unit conversion was performed, thereby determining the density (kg/m³) of the expanded beads molded article.

The molded article density (X) or (Y) at the sample positions A to F shown in Table 1 is an average value of three test pieces collected at respective sample positions in FIG. 1.

The average molded article density (Z) of the expanded beads molded article 10 was separately sampled at five locations in the left-right direction on a front side, a rear side, and a central portion, and an average value of the molded article densities at the five locations was determined.
(Measurement of Fusion Rate)

From the six positions A to F shown in FIG. 1, cut samples each having a test piece length of 150 mm in the left-right direction of the expanded beads molded article 10, a test piece width of 75 mm in the thickness direction of the expanded beads molded article 10, and a test piece thickness of 25 mm in the front-rear direction of the expanded beads molded article 10 were cut out to obtain test pieces.

A cut having a depth of 2 mm was formed on one surface (one surface of surfaces each having a length of 150 mm, a width of 75 mm, and a thickness of 25 mm) of a test piece (having a length of 150 mm, a width of 75 mm, and a thickness of 25 mm) at the central portion in the length direction in a manner of crossing the entire width. Next, the test piece was bent in a direction widening the cut of the test piece until the test piece was fractured or until both end portions of the test piece were brought into contact with each other. Next, a fracture surface of the test piece was observed, and the number of expanded beads whose inside was fractured and the number of expanded beads peeled off at an interface between the expanded beads were counted by visual observation. Next, a ratio of the number of the expanded beads whose inside was fractured to the total of the number of the expanded beads whose inside was fractured and the number of the expanded beads peeled off at the interface was calculated and determined.

More specifically, first, in a rectangular parallelepiped shaped molded article sample of 150 mm (length)×75 mm (width)×25 mm (thickness), a cut having a depth of 2 mm was formed on one surface (one surface of surfaces each having a length of 150 mm and a width of 25 mm) at a central portion in the length direction in a manner of crossing the entire width, and the molded article sample with the cut was used as a test piece. Next, the test piece was disposed evenly across two support plates such that the surface provided with the cut was directed downward and the length direction of the test piece was perpendicular to the support plates. The two support plates were erected in parallel such that the distance between centers was 70 mm, and were made of a rigid body having an upper end edge rounded to have a radius of curvature of 5 mm and having a height of 100 mm, a width of 80 mm or more, and a thickness of 10 mm. Thereafter, a pressing plate which was made of a rigid body having a tip end rounded to have a radius of 5 mm and having a height of 60 mm, a width of 80 mm, and a thickness of 10 mm was set such that a central portion of the pressing plate in the thickness direction coincides with the cut of the test piece. Then, a three-point bending test was performed from a side of the test piece opposite to the cut with a pressing speed of the pressing plate being 200 mm/min. The pressing plate was pressed against the test piece until the test piece was fractured or until the test piece was separated from the support plate and completely inserted between the support plates. Next, the fracture surface of the test piece was observed, and the number of the expanded beads whose inside was fractured due to breakage of the expanded beads was counted by visual observation. Separately, the number of expanded beads peeled off at the interface of the fused expanded beads was counted. Next, the ratio of the number of the expanded beads whose inside was fractured to the total of the number of the expanded beads whose inside was fractured and the number of the expanded beads peeled off at the interface was calculated and expressed in percentage as the fusion rate (%).

(Measurement of Tensile Strength)

As for the tensile strength, test pieces having a dumbbell-shaped No. 1 shape defined in JIS K6251 (2010) and a thickness of 10 mm were sampled from the six positions A to F in the same manner as described above, and the sampled test pieces were measured in accordance with a method for measuring the tensile elongation specified in JIS K6767 (1999). In this case, the collected test piece was left to stand for 24 hours under conditions of 23° C. and a humidity of 50%, and then subjected to a tensile test at a test speed of 500 mm/min, and the maximum point stress in the measurement was defined as the tensile strength. The above measurement was performed three times, and an arithmetic mean value of the obtained values was adopted.

TABLE 1

| | Measurement location | A | B | C |
|---|---|---|---|---|
| | Compression rate [%] of front portion | 10 | 11 | 13 |
| Front | Molded article density [kg/m³] | 26 | 26 | 26 |
| thick | Fusion rate [%] | 55 | 55 | 55 |
| portion | Tensile strength [kPa] | 298 | 298 | 298 |

| | Measurement location | D | E | F |
|---|---|---|---|---|
| | Compression rate [%] of rear portion | 29 | 33 | 40 |
| Rear | Molded article density [kg/m³] | 33 | 34 | 36 |
| thin | Fusion rate [%] | 88 | 80 | 82 |
| portion | Tensile strength [kPa] | 460 | 508 | 540 |
| | Density ratio (Y/X) | 1.27 | 1.3 | 1.37 |
| | Density ratio (Y/Z) | 1.1 | 1.13 | 1.2 |

Comparative Example

A seat core material was molded in the same manner as in Example 1 except that a mold was filled with the multilayer expanded beads described above by a compression filling method (pressure: 0.2 MPa) instead of the cracking filling method, and was used as Comparative Example.

The average molded article density (Z) of the expanded beads molded article constituting the seat core material was 28 kg/m³. As for a test piece (length: 50 mm, width: 50 mm, and thickness: 10 mm) cut out from a front thick portion (thickness: 90 mm) of the expanded beads molded article in Comparative Example, the molded article density (X) was 28 kg/m³, the fusion rate was 55%, and the tensile strength was 311 N. On the other hand, as for a test piece (length: 50 mm, width: 50 mm, and thickness: 10 mm) cut out from a rear thin portion (thickness: 30 mm) of the expanded beads molded article in Comparative Example, the molded article density (Y) was 26 kg/m³, the fusion rate was 80%, and the tensile strength was 380 N. Therefore, a density ratio (Y/X) was 0.93, and a density ratio (Y/Z) was 0.93.

The appearance of the obtained expanded beads molded article did not have partial burning, and the surface of the expanded beads molded article was beautiful.

INDUSTRIAL APPLICABILITY

The vehicle seat core material in the present invention is a vehicle seat core material in which cracking or chipping is less likely to occur even in the rear thin portion, and thus can be effectively used as a seat core material for various vehicles.

REFERENCE SIGNS LIST

1 Expanded beads
10 Expanded beads molded article
A, B, C Front portion of expanded beads molded article
D, E, F Rear portion of expanded beads molded article
30 Frame member
31 Front hook member
32 Rear hook member
50 Mold
51 Recessed mold
52 Protruded mold
53 Feeder
100 Vehicle seat core material

The invention claimed is:

1. A vehicle seat core material comprising a molded article that comprises thermoplastic resin expanded beads at least a portion of which are fused together,
wherein the molded article has a substantially rectangular shape in a top view, and has a front side and a rear side opposite the front side,
the molded article has an average density (Z) of 20 kg/m³ to 50 kg/m³,
the molded article includes, on the rear side of the molded article, a rear thin portion having a thickness of 10 mm to 40 mm, the thickness of the rear thin portion being smaller than an average thickness of the molded article, the rear side is a part from the center to the rear in the front-rear direction of the molded article, and the rear thin portion occupies at least 8% of the entire volume of the molded article,
the front side of the molded article includes a front thick portion having a thickness of 80 mm or more,
a ratio (Y/Z) of a density (Y) of the rear thin portion to the average density (Z) of the molded article is 1.05 to 3,
a ratio (Y/X) of the density (Y) of the rear thin portion to a density (X) of the front thick portion of the molded article is 1.1 to 1.5,
the rear thin portion of the molded article has a fusion rate of 70% or more, and
the molded article is formed as an integrally molded article.

2. The vehicle seat core material according to claim 1, wherein the front thick portion of the molded article has a fusion rate of 40% or more.

3. The vehicle seat core material according to claim 1, wherein a frame member is embedded in the rear thin portion of the molded article along a longitudinal direction of the molded article.

4. The vehicle seat core material according to claim 1, wherein the thermoplastic resin expanded beads are multilayer expanded beads having an expanded core layer and a coating layer that covers the expanded core layer.

5. The vehicle seat core material according to claim 4, wherein a melting point of the coating layer constituting the multilayer expanded beads is 1 to 25° C. lower than a melting point of the expanded core layer.

6. The vehicle seat core material according to claim 1, the ratio (Y/Z) of the density (Y) of the rear thin portion to the average density (Z) of the molded article is 1.05 to 2.

7. The vehicle seat core material according to claim 6, the ratio (Y/Z) of the density (Y) of the rear thin portion to the average density (Z) of the molded article is 1.05 to 1.5.

* * * * *